United States Patent [19]

Glass

[11] Patent Number: 5,077,025

[45] Date of Patent: Dec. 31, 1991

[54] PROCESS OR PURIFYING WASTE GASES BY SCRUBBING WITH AN ADSORBENT SUSPENSION

[75] Inventor: Reinhard Glass, Voerde Zu Nennen, Fed. Rep. of Germany

[73] Assignee: Arasin GmbH, Voerde-Emmelsum, Fed. Rep. of Germany

[21] Appl. No.: 404,508

[22] Filed: Sep. 8, 1989

[30] Foreign Application Priority Data

Sep. 9, 1988 [DE] Fed. Rep. of Germany ....... 3830803

[51] Int. Cl.$^5$ ......................... B01J 8/00; C07C 11/24; C01B 17/00; A61L 9/01
[52] U.S. Cl. ........................... 423/245.1; 423/DIG. 7; 210/621; 210/622; 435/266
[58] Field of Search ................... 423/245.1, DIG. 17; 210/621, 622; 433/266

[56] References Cited

U.S. PATENT DOCUMENTS

| 3,617,537 | 11/1971 | Vermette | 210/622 |
| 4,544,381 | 10/1985 | Schmidt | 435/266 |
| 4,662,900 | 5/1987 | Ottengraf | 435/266 |

FOREIGN PATENT DOCUMENTS

| 0147721 | 7/1985 | European Pat. Off. | |
| 2643211 | 4/1978 | Fed. Rep. of Germany | 435/266 |
| 3227375 | 3/1984 | Fed. Rep. of Germany | |
| 3345944 | 7/1985 | Fed. Rep. of Germany | |
| 2374070 | 7/1978 | France | 433/266 |

Primary Examiner—Gregory A. Heller
Attorney, Agent, or Firm—Foley & Lardner

[57] ABSTRACT

The present invention relates to a process and apparatus for purifying waste gases by scrubbing with an adsorbent suspension. The adsorbent suspension in a concentration from 40 g/l to 200 g/l is here distributed uniformly or almost uniformly in at least one gas-scrubbing device, passed through at least one ordered mass transfer zone and contacted with the gas and then passed into at least one separately arranged reactor, the biologically degradable or convertible impurities are reacted, with the additional use of aerobic bacteria and oxygen, with forced motion and the purified liquid or suspension is recycled, wholly or as part stream, to the gas-scrubbing device, distributed therein and contacted again with the gas which is to be purified.

18 Claims, 2 Drawing Sheets

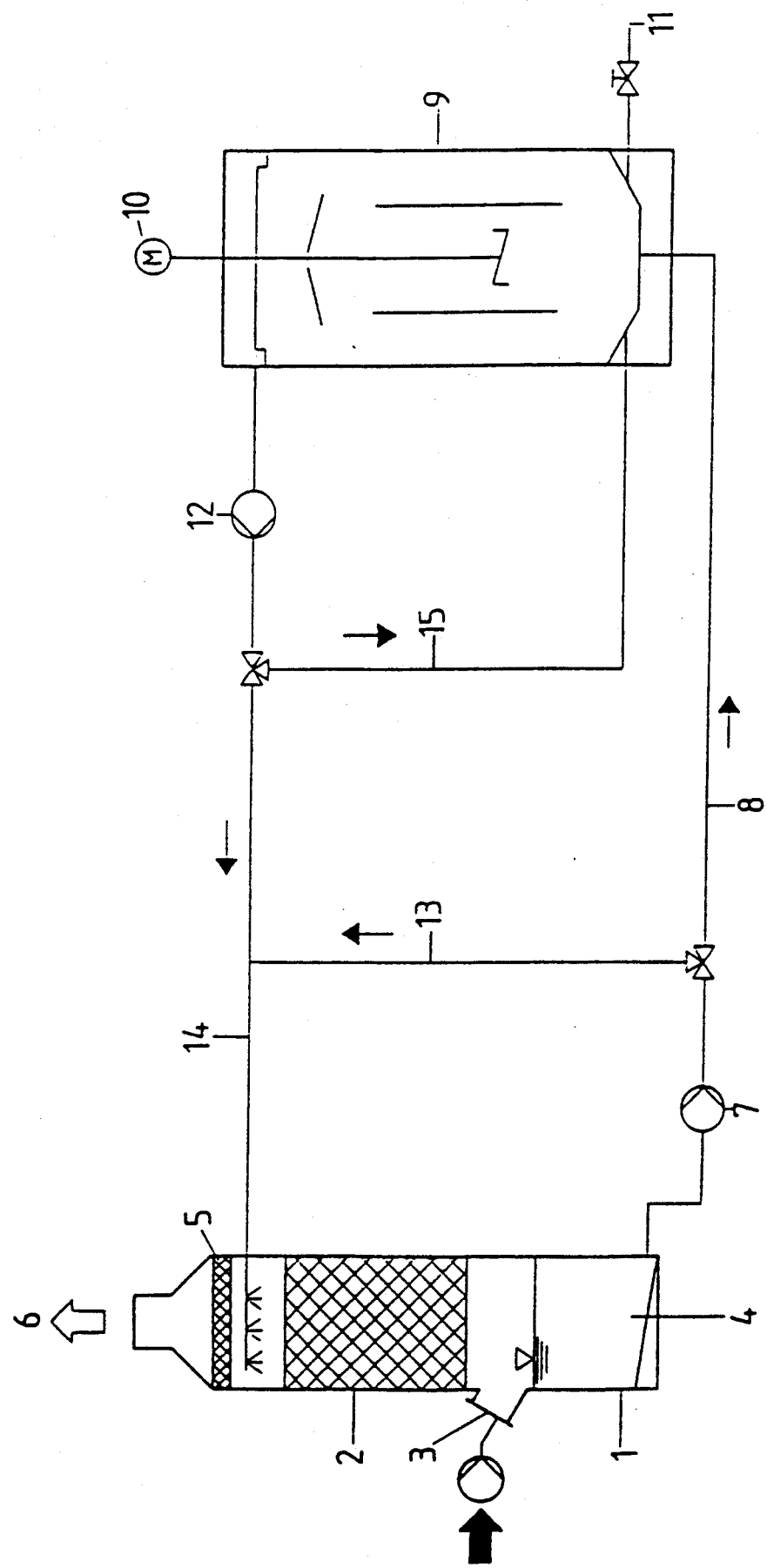

PROCESS OR PURIFYING WASTE GASES BY SCRUBBING WITH AN ADSORBENT SUSPENSION

BACKGROUND OF THE INVENTION

The present invention relates to a process and apparatus for purifying waste gases by scrubbing with an adsorbent suspension which contains at least one finely dispersed adsorbent which is fed continuously to at least one gas-scrubbing device, distributed therein and contacted with the waste gas. In such a process, the pollutants, impurities or the substances which are to be separated off, or parts thereof, are converted, degraded and/or chemically or physically modified by biological means and subsequently wholly or partially separated off.

The adsorbent suspension in a relatively high average use concentration is distributed uniformly or almost uniformly in the gas-scrubbing device and has a very short residence time or a relatively high passage velocity therein, while it is passed subsequently into at least one reactor, arranged separately from the gas-scrubbing device and containing aerobic bacteria, and is treated therein at a very much longer residence time with forced motion, the biological conversion of impurities taking place.

Similar processes, are disclosed, for example, in German Offenlegungsschriften 3,227,375 and 3,345,944. However, in the known processes activated sludges and/or other biological solids are deposited in considerable thicknesses on the adsorbent material, active beds are blocked by growth, or the activity of the adsorbents is blocked to a considerable extent, so that the effect of the adsorbents is very considerably weakened and, after a certain time, the adsorbent then serves more or less only as a carrier material.

SUMMARY OF THE INVENTION

Accordingly, it is an object of the present invention to provide an improved process for purifying waste gases by scrubbing with an adsorbent suspension.

Another object of the present invention is to provide a process which is effective either with or without the presence of bacteria in the scrubbing device.

A further object of the present invention is to provide a process which gives a good yield with respect to the biodegradable substances and has a reduced risk of blockage due to bacterial growth, activated sludge in the scrubbing device or extensive blockage of the activity of the adsorbents.

Yet another object of the present invention is to provide a process having improved precipitation of pollutants which are sparingly soluble in water or are largely water-insoluble.

A still further object of the present invention is to provide an apparatus for carrying out the improved process.

In accomplishing the foregoing objectives, there has been provided, in accordance with one aspect of the present invention, a process for purifying a waste gas containing biologically degradable or convertible impurities by scrubbing with an adsorbent suspension which comprises the steps of continuously feeding to at least one gas-scrubbing device an adsorbent suspension comprising at least one finely dispersed adsorbent having a mean particle diameter of about 0.0001 to 5 mm in an average use concentration of from about 40 to 200 g/l; uniformly or substantially uniformly distributing the adsorbent suspension in the gas-scrubbing device; passing the adsorbent suspension in the gas-scrubbing device over at least one ordered mass-transfer zone; contacting the suspension with the waste gas within the mass-transfer zone whereby the impurities are transferred into the suspension; passing the suspension into at least one reactor; reacting the impurities contained in the suspension with aerobic bacteria and oxygen or oxygen-containing gases under forced motion of the suspension in the reactor to produce a purified suspension; separating off the impurities wholly or in part from the purified suspension: and recycling the purified suspension wholly or in part to the gas-scrubbing device.

In accordance with another aspect of the present invention there is provided an apparatus for purifying a waste gas comprising a) a gas-scrubbing device having an ordered mass transfer zone which comprises a plurality of tube-like or prism-like mass transfer devices or drip packing which have a large free passage capacity or flow capacity relative to the total flow and which are arranged in parallel to or approximately parallel to the direction of the flow, dripping or passage of the adsorbent suspension, for contact of the adsorption suspension with the waste gas; and b) a reactor for the biodegradation of impurities contained in the adsorption suspension through reaction with aerobic bacteria which comprises means for producing forced motion of the adsorbent suspension and the aerobic bacteria.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawings in which FIG. 2 is a diagram showing a second embodiment of the apparatus according to the invention.

DETAILED DESCRIPTION OF THE PREFERRED EMBODIMENTS

Figure 1:
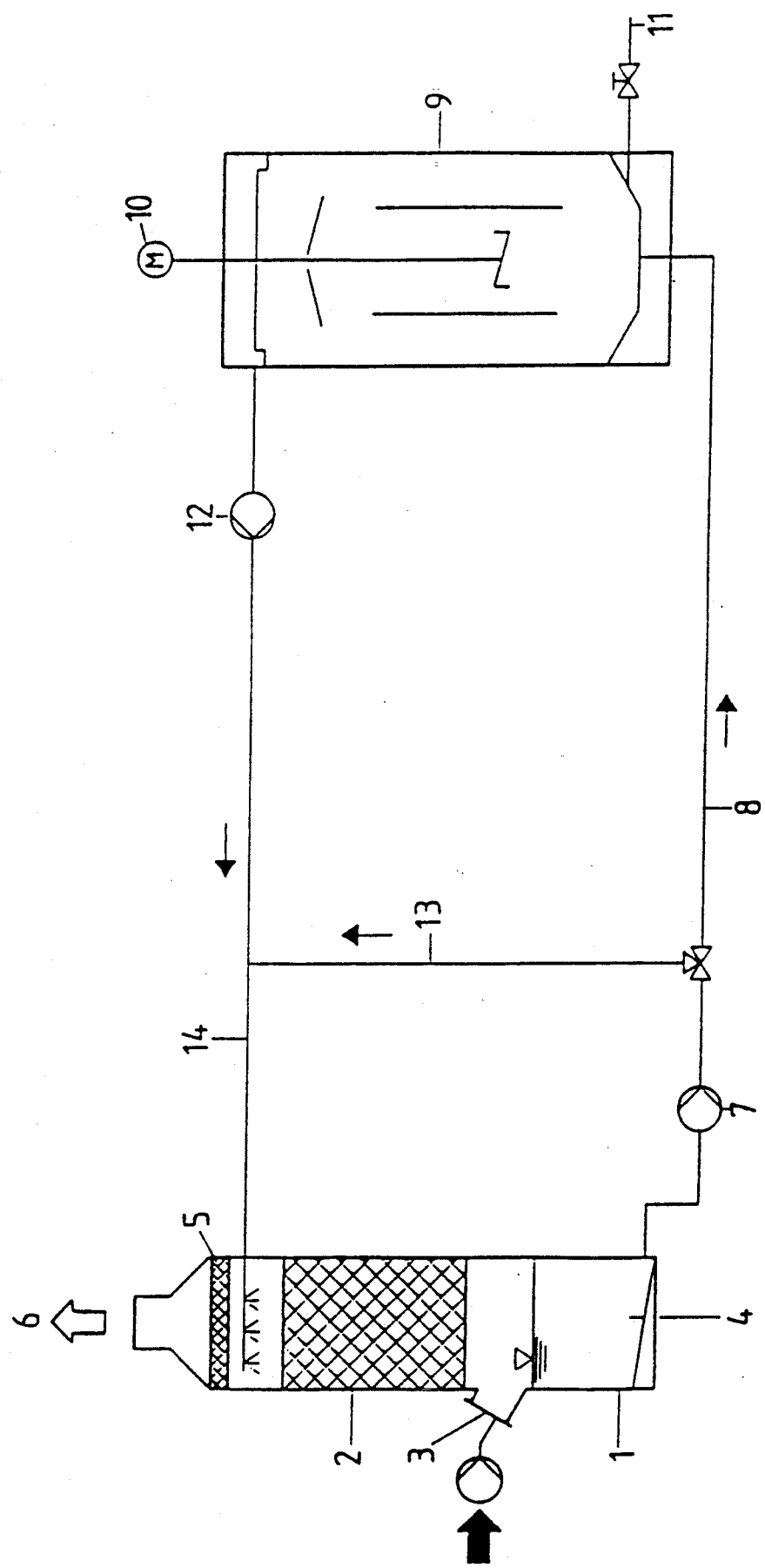
FIG. 1 is a diagram showing an embodiment of the apparatus according to the invention.

According to a preferred embodiment, the adsorbent suspension also contains aerobic bacteria, but it can also operate without bacteria and is independent of the bacteria concentration.

According to a preferred embodiment of the process according to the invention, the adsorbent suspension is distributed by means of a liquid distributor device in the gas-scrubbing device at a minimum wetting rate from about 3 to 40 $m^3/m^2h$, preferably 5 to 25 $m^3/m^2h$.

According to the present invention, the mean residence time of the adsorbent suspension in the gas-scrubbing device or in the mass transfer zone of the gas-scrubbing device is less than 40 seconds, whereas the mean residence time of the adsorbent suspension, combined with aerobic bacteria, in the reactor must be maintained at more than 90 times, preferably more than 150 times, the mean residence time in the gas-scrubbing device or mass transfer device. Inter alia, this has the result that, in combination with the adsorbent concentration to be maintained, operation in the gas-scrubbing device is possible both in the presence and in the absence of aerobic bacteria, the risk of blockage due to growth by bacteria cultures and other substances in the gas-scrubbing device is reduced and/or the risk of blockage of the adsorbent particles by growth of bacteria around them is reduced.

According to a preferred embodiment, the forced motion in the reactor is effected at such a velocity that on average more than 1 $dm^3$ of adsorbent dispersion or scrubbing liquid is moved by more than 1 dm within less than 30 seconds, preferably within less than 10 seconds. According to one embodiment, the forced motion takes place at a velocity of more than 0.05 m/second, preferably at a velocity of from about 0.1 m/second to 0.35 m/second.

The adsorbents which can be used are the adsorbents known per se, for example zeolite, silica gel and the like. Preferably, however, activated carbon is used. According to one embodiment, the activated carbon can also comprise, for example, very finely ground bituminous coal, lignite, bituminous coal coke, lignite coke or peat coke and the like.

According to a preferred embodiment, the adsorbent suspension consists of an aqueous activated carbon suspension or an aqueous suspension containing adsorptive carbon, the suspension containing activated carbon of a mean particle diameter from about 0.005 mm to 1 mm. The aqueous activated carbon suspension is preferably distributed in an average use concentration from 50 g/l to 150 g/l in the gas-scrubbing device. Atomization of the suspension is to be avoided since in that case the short residence times cannot be maintained and, on the other hand, there is a risk of blockage of the nozzles. The residence time of the scrubbing liquid, containing the adsorbent and aerobic bacteria, in the vortex reactor under forced motion is about 1 to 4 hours, preferably 2 to 3 hours.

In the biological conversion in the reactor, the scrubbing liquid which is to be purified and/or the scrubbing liquid in the gas-scrubbing device is adjusted to a pH value from about 5.5 to 8.5, preferably 6 to 8. The degradation reactions can most conveniently be carried out in this pH range. According to the invention, the ordered mass transfer zone comprises a plurality of mass transfer devices which have a large free passage capacity or flow capacity relative to the total flow and which are arranged in, parallel to or approximately parallel to the direction of the flow, dripping or passage of the adsorbent suspension or vertically or approximately vertically in the scrubbing tower. According to another preferred embodiment of the process, a part of the activated carbon is separated off after the passage through at least one gas-scrubbing device. This part of the liquid containing activated carbon is circulated and added to the purified activated carbon suspension coming from the reactor, for maintaining the use concentration.

The process according to the invention operates independently of the bacteria concentration in the scrubbing device. That is to say, the process operates in the absence of bacteria, or with the collaboration of bacteria therein. It shows a good yield with respect to the biodegradable substances. The risk of blockage due to growth by bacteria or, if appropriate, activated sludge in the scrubbing water tower, or of the adsorbents being extensively blocked, is reduced. Furthermore, it is possible to increase the degree of separation of substances which are poorly water-soluble, have a limited water solubility or are largely water-insoluble, and thus also to biodegrade a greater quantity of these compounds. Such organic, biodegradable pollutants are, inter alia, benzene, benzene derivatives and other aromatic hydrocarbons.

According to the invention, the scrubbing liquid which is to be purified is introduced into a reactor part space into a mixture (reactor liquid) present therein and comprising water or scrubbing liquid. The introduced adsorbent-containing scrubbing liquid and reactor liquid here pass over or pass through into the remaining reactor space, forming circulating flows or vortices. The formation of the circulating flows or vortices is assisted or controlled by the introduced scrubbing liquid which is to be purified, preferably by the pressure of the scrubbing liquid feed pump or by at least one agitator.

According to the invention, the air or oxygen feed required for the aerobic microorganisms takes place wholly or to the extent of more than 50%, preferably to the extent of more than 80% (relative to the requisite oxygen or air requirement) via the introduced scrubbing liquid from the gas-scrubbing device.

According to one embodiment, the adsorbent-containing scrubbing liquid which passes through the reactor flows, during the complete or partial degradation of the biodegradable impurities in the scrubbing liquid by aerobic microorganisms, through at least one reactor part space, preferably at least one feed shaft or feed pipe, arranged above the bottom of the reactor, before the purified scrubbing liquid is passed into the gas-scrubbing device.

Within the scope of the present invention, it is possible to remove the most diverse pollutants from the waste gas and to degrade them by biological means. For example, aromatic hydrocarbons, alcohols, esters, ketones, aldehydes, organic solvents and the like are biodegradable.

According to a preferred embodiment, the liquid in the reactor space (reactor liquid) is adjusted to a temperature from 10° to 50° C., preferably 17° to 30° C.

Preferably, the scrubbing liquid is here introduced from below or at the bottom of the reactor in such a way that it enters in and below the reactor part space, preferably in and below the feed shaft or feed pipe, and mainly flows through the latter upwards in the direction of the surface of the reactor liquid. According to a preferred embodiment, the feed shaft or feed shafts or the feed pipe or feed pipes is or are arranged at a distance from the sidewalls, as far as possible approximately in the vicinity of a center line of the reactor or approximately centrally.

According to another embodiment, the scrubbing liquid is treated before or after the introduction into the reactor space or reactor part space with a chemical water treatment agent, preferably a flocculant or polyelectrolyte, and separated from precipitates or sludges formed.

According to a preferred embodiment, at least a part of the adsorbent-containing scrubbing liquid purified in the reactor or partially purified adsorbent-containing scrubbing liquid is circulated (preferably with the insertion of pumps and the like) and recycled to another entry point of the reactor.

This makes it possible, within the process, to adjust the system to varying pollutant concentrations. The measure is preferably also combined with a partial recycle of the pollutant-containing adsorbent suspension from the scrubbing device to the liquid distributor device in the scrubbing device, preferably with additional use of a part stream from the reactor.

The invention also relates to an apparatus for purifying waste gases, comprising at least one gas-scrubbing device for contact of an adsorbent suspension with the waste gas, at least one device or reactor for the biodegradation of gas impurities or pollutants, with the additional use of aerobic bacteria and, if necessary, a prepurification device, the devices being directly or indirectly connected in a manner known per se. According to the invention, in the gas-scrubbing device, an ordered mass transfer zone is arranged which comprises tube-like or prism-shaped mass transfer devices or drip packing which have a large free passage capacity or flow capacity and which are arranged in parallel to or approximately in parallel to the direction of the flow, dripping or passage of the adsorbent suspension, or vertically or approximately vertically in the scrubbing tower. The reactor may be a vortex-type reactor which is provided with at least one stirring or pumping device or similar devices for forced motion and churning of the adsorption suspension and aerobic bacteria.

The tube-like or prism-shaped mass transfer devices or drip packing preferably have perforated, interrupted or net-like sidewalls.

According to an embodiment of the invention, the gas-scrubbing device is provided with at least one pipeline or hoseline which leads directly, or with insertion of further purification devices, to the reactor containing microorganisms, the latter device being connected to the scrubbing tower by a further pipeline or hoseline. The reactor, containing microorganisms, is divided by at least one partition, preferably a dividing shaft or dividing pipe, into a feed shaft space and the remaining reactor space. The lower edge of the partition is located at a distance of more than 7 cm, preferably more than 20 cm (measured in the vertical direction), from the reactor bottom, the feed point for the scrubbing liquid which is to be purified is located in the vicinity of the feed shaft space, preferably underneath the feed shaft space, and the water outlet point is located in the upper part of the reactor space.

According to one embodiment, the dividing shaft or dividing pipe has interruptions, slots, holes or recesses.

According to a preferred embodiment, at least one agitator is arranged in the reactor part space, preferably in the feed shaft space or feed pipe.

Preferably, a plurality of gas-scrubbing devices or reactors connected in series or in parallel are used.

According to another embodiment, the dividing shaft or dividing pipe consists of a plurality of dividing shafts or dividing pipes arranged one above the other or concentrically or almost concentrically within one another.

The dividing shaft can also be made in the shape of a funnel and have a smaller or larger diameter (relative to the upper diameter) in the vicinity of the feed point for the scrubbing liquid, but the deviations in the diameter should be small. Preferably, the dividing shaft or the dividing pipe has the same diameter or approximately the same diameter at both the feed point for the scrubbing liquid and at the outlet point. According to a preferred embodiment, the liquid feed point is designed as an overflow device or overflow channel.

Moreover, according to a preferred embodiment, the reactor bottom has an oblique or approximately concave shape, or comprises at least one bottom plate in an oblique or approximately concave arrangement.

The reactor part space, preferably the feed shaft or feed pipe, is arranged above the lowest point of the reactor bottom at a distance of more than 7 cm, preferably more than 20 cm (measured in a vertical direction from the reactor bottom).

According to one embodiment, at least one opening or at least one distribution device or dispensing device for air which is to be additionally introduced or for oxygen which is to be introduced is located underneath the feed shaft space.

However, this device serves only as an auxiliary device for the case that the scrubbing liquid circulation has to be interrupted for some time, or for the case that sufficient air or oxygen cannot be absorbed in the scrubbing tower by the circulated scrubbing liquid.

According to a preferred embodiment, the scrubbing tower is connected to or provided with at least one further vessel or, preferably in the lower part of the scrubbing tower, is provided with a scrubbing liquid receiver (as a part space of the scrubbing tower). The scrubbing liquid passed through in counter-current to the gas is collected in these vessel part spaces or vessels, before the scrubbing liquid laden with the waste gases or impurities passes again into the scrubbing tower or into the reactor or reactor part space. According to a preferred embodiment, a demister zone is arranged above the mass transfer zone or above the adsorbent suspension feed.

According to a further preferred embodiment, an oblique bottom or funnel-shaped bottom is arranged in the gas-scrubbing device for improved discharge of the pollutant-containing and adsorbent-containing suspension for recycle to the reactor.

Illustrative examples of the process according to the invention and of the apparatus according to the invention are diagrammatically shown in the attached FIGS. 1 and 2.

In FIGS. 1 and 2, the adsorbent-containing suspension, preferably an activated carbon suspension having an average use concentration from 40 g/l to 200 g/l, is introduced into the gas-scrubbing device (1), which preferably is a counter-current absorber or a scrubbing tower. The suspension enters above an ordered mass transfer zone (2) and is uniformly or almost uniformly distributed. The gas enters at crude gas inlet (3) and is contacted with the adsorbent suspension, preferably in counter-current. Any entrained liquid drops are retained in the demister zone (5), before the purified gas emerges at the gas exit point (6). A scrubbing liquid receiver (4) which, according to a preferred embodiment, has an oblique or funnel-shaped bottom, is preferably arranged at the bottom of the gas-scrubbing device. Using at least one pump, preferably a circulation pump (7), the pollutant-laden suspension containing activated carbon (the scrubbing liquid) is pumped away from the gas-scrubbing device (1) and passed preferably via a feedline (8) to a reactor, preferably a moving-bed reactor (9). The reactor (9) contains aerobic bacteria which, with the additional use of oxygen or oxygen-containing gases, degrade the gas impurities, the liquid being held in forced motion, preferably by using at least one stirring device (10), which may be motor driven, or at least one additional pump. An opening or device for removal of sludge (11) is arranged on the reactor, preferably at the bottom or in the vicinity of the bottom thereof. Using at least one circulating pump (12) associated with the reactor (9), the purified adsorbent suspension containing activated carbon is passed to the gas-scrubbing device and in the latter again contacted with the crude gas.

Optionally, a part stream (15) (FIG. 2) of the purified adsorbent-containing scrubbing liquid is introduced at another point of the reactor, preferably in the lower part of the reactor or in the vicinity of the bottom thereof. According to another embodiment, the purified suspension part steam can be combined with a part stream of the scrubbing liquid (13), still containing impurities along with the adsorbent, and recycled to the scrubbing device. The return flow from the reactor (9) takes place via the return line (14).

ILLUSTRATIVE EXAMPLE

An activated carbon suspension having an average use concentration of 60 g/l was introduced into the gas-scrubbing device (1) and uniformly distributed over an ordered mass transfer zone (2) consisting of tube-like plastic packing with perforated or net-like sidewalls.

The gas entered at crude gas inlet (3) laden with pollutants, was passed through in the direction opposite to the activated carbon suspension flowing down and was contacted with the activated carbon suspension in mass transfer zone (2). The average wetting rate in the gas-scrubbing device was 20 $m^3/m^2h$. The gas was passed through the gas-scrubbing device at a velocity of 2 m/second. The scrubbing liquid containing pollutants and adsorbent was taken off at the bottom of the gas-scrubbing device from a scrubbing liquid receiver (4) and passed to at least one reactor, preferably a moving-bed reactor (9), and purified therein at a mean residence time of 3 hours with continuous forced motion, preferably with the use of at least one stirrer (10) or at least one pump, and in the presence of aerobic bacteria and oxygen. The purified scrubbing liquid containing activated carbon was recycled into the gas-scrubbing device.

What is claimed is:

1. A process for purifying a waste gas containing biologically degradable impurities by scrubbing with an adsorbent suspension which comprises the steps of:
    continuously feeding to at least one gas-scrubbing device an adsorbent suspension comprising at least one finely dispersed activated carbon having a mean particle diameter of about 0.005 to 1 mm in an average use concentration of from about 40 to 200 g/l;
    uniformly or substantially uniformly distributing said adsorbent suspension in said gas-scrubbing device at a pH from about 5.5 to 8.5 and at a minimum wetting rate from about 3 to 40 $m^3/m^2h$;
    passing said adsorbent suspension in said gas-scrubbing device over at least one ordered mass-transfer zone;
    contacting said suspension with said waste gas within said mass-transfer zone whereby said impurities are transferred into said suspension;
    passing said suspension into at least one reactor;
    reacting said impurities contained in said suspension with aerobic bacteria and oxygen or oxygen-containing gases under forced motion of said suspension in said reactor at such a velocity that on average more than 1 $dm^3$ of adsorbent dispersion is moved by more than 1 dm within less than 30 seconds to produce a purified suspension, whereby the liquid in the reactor space is adjusted to a temperature from 10 to 50° C.; and
    recycling said purified suspension wholly or in part to said gas-scrubbing device.

2. The process as claimed in claim 1, wherein said wetting rate is 5 to 25 $m^3/m^2h$.

3. The process as claimed in claim 1, wherein the mean residence time of said adsorbent suspension in said gas-scrubbing device is less than 40 seconds, and the mean residence time of said adsorbent suspension, with the addition of aerobic bacteria, in said reactor is more than 90 times the mean residence time in said gas-scrubbing device.

4. The process as claimed in claim 3, wherein the mean residence time of said adsorbent suspension in said reactor is more than 150 times the mean residence time in said gas-scrubbing device.

5. The process as claimed in claim 3, wherein said mean residence time of said adsorbent suspension in said gas-scrubbing device is less than 12 seconds.

6. The process as claimed in claim 5, wherein the mean residence time of said adsorbent suspension in said gas-scrubbing device is less than 6 seconds.

7. The process as claimed in claim 1, wherein more than 1 $dm^3$ of adsorbent suspension is moved by more than 1 dm within less than 10 seconds.

8. The process as claimed in claim 1, wherein said adsorbent suspension is distributed in said gas-scrubbing device in an average use concentration of from 50 to 150 g/l.

9. The process as claimed in claim 1, wherein the mean residence time of the adsorbent suspension together with aerobic bacteria in the reactor under forced motion is about 1 to 4 hours.

10. The process as claimed in claim 9, wherein the mean residence time of the adsorbent suspension together with aerobic bacteria in the reactor under forced motion is 2 to 3 hours.

11. The process as claimed in claim 1, wherein said pH value is 6 to 8.

12. The process as claimed in claim 1, wherein said ordered mass transfer zone comprises a plurality of mass transfer devices which have a large free passage capacity or flow capacity relative to the total flow and which are arranged in, parallel to or approximately parallel to said direction of the flow, dripping or passage of the adsorbent suspension.

13. The process as claimed in claim wherein a part of the adsorbent suspension is separated off after the passage through at least one gas-scrubbing device and recycled without purification to said gas-scrubbing device.

14. The process as claimed in claim 13, wherein said part of the adsorbent suspension is added to said purified suspension coming from said reactor.

15. The process as claimed in claim 1, wherein the suspension to be purified is introduced into a reactor part space and into a reactor liquid mixture present therein comprising water or adsorbent suspension, and wherein the introduced suspension and reactor liquid pass through into the remaining reactor space, forming circulating flows or vortices, and wherein the formation of the circulating flows or vortices is controlled or assisted by the introduced suspension which is to be purified.

16. The process as claimed in claim 15, wherein the formation of said circulating flows or vortices is controlled or assisted by a feed pump for the suspension or by at least one agitator in said reactor.

17. The process as claimed in claim 1, wherein said adsorbent suspension passing through said reactor flows through at least one reactor part space arranged above the bottom of said reactor during the complete or partial degradation of said biodegradable impurities contained in said adsorbent suspension by aerobic bacteria, before said purified adsorbent suspension is passed into said gas-scrubbing device.

18. The process as claimed in claim 17, wherein said reactor part space is a feed shaft or feed pipe.

* * * * *